(12) United States Patent
Zhao et al.

(10) Patent No.: US 9,961,702 B2
(45) Date of Patent: May 1, 2018

(54) METHOD AND SYSTEM FOR CONTENTION QUEUING USING A QUEUE-BASED MAC PROTOCOL

(71) Applicant: Macau University of Science and Technology, Macau (MO)

(72) Inventors: Qinglin Zhao, Macau (MO); Fangxin Xu, Macau (MO); Yu Zeng, Macau (MO); Jie Yang, Macau (MO)

(73) Assignee: Macau University of Science and Technology, Macau, MO (US)

( * ) Notice: Subject to any disclaimer, the term of this patent is extended or adjusted under 35 U.S.C. 154(b) by 102 days.

(21) Appl. No.: 14/828,159

(22) Filed: Aug. 17, 2015

(65) Prior Publication Data

US 2017/0019933 A1 Jan. 19, 2017

Related U.S. Application Data

(60) Provisional application No. 62/193,065, filed on Jul. 15, 2015.

(51) Int. Cl.
*H04W 74/08* (2009.01)
*H04W 74/00* (2009.01)
*H04W 74/02* (2009.01)

(52) U.S. Cl.
CPC ..... *H04W 74/0866* (2013.01); *H04W 74/008* (2013.01); *H04W 74/08* (2013.01); *H04W 74/02* (2013.01); *H04W 74/0816* (2013.01)

(58) Field of Classification Search
CPC .......................... H04W 74/0086; H04W 72/14

(Continued)

(56) References Cited

U.S. PATENT DOCUMENTS 6,721,775 B1 * 4/2004 Fagen ..................... G06F 9/524
                                                        718/100
6,842,437 B1 * 1/2005 Heath ................... H04B 7/1858
                                                        370/322

(Continued)

OTHER PUBLICATIONS

J. Fang, K. Tan, Y. Zhang, S. Chen, L. Shi, J. Zhang, Y. Zhang, and Z. Tan, "Fine-grained channel access in wireless lan," IEEE/ACM Transactions on Networking (TON), vol. 21, No. 3, pp. 772-787, 2013.

(Continued)

*Primary Examiner* — Mang Yeung
*Assistant Examiner* — Peter G Solinsky
(74) *Attorney, Agent, or Firm* — Spruson & Ferguson (Hong Kong) Limited

(57) ABSTRACT

A MAC protocol, useful for wireless local area networks (WLANs), is provided for improving throughput efficiency. The protocol includes three concurrent processes, and the channel is divided into a contention subchannel and a transmission subchannel. In the contention process, all nodes use the standard RTS/CTS mechanism operated on the contention channel to contend for a right of transmission. When one node gains the right, all the nodes store the contention result into their respective contention queue (CQ) buffers. In the transmission process, the nodes sequentially transmit their data over the transmission channel according to the order of the nodes stored in the CQ buffers. When one node finishes data transmission, the CQ buffers are updated. The contention process and the transmission process are connected by the queuing process, where each node dynamically updates its own CQ buffer according to the contention result and each instance of data transmission.

17 Claims, 6 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 8,046,484 | B2* | 10/2011 | Ayyagari | H04B 3/54 370/390 |
| 2004/0081089 | A1* | 4/2004 | Ayyagari | H04B 3/54 370/229 |
| 2006/0055958 | A1* | 3/2006 | Kim | H04L 29/06 358/1.14 |
| 2006/0268786 | A1* | 11/2006 | Das | H04B 7/2618 370/335 |
| 2010/0279672 | A1* | 11/2010 | Koskela | H04W 36/30 455/418 |
| 2013/0297754 | A1* | 11/2013 | Wentink | H04W 48/18 709/220 |
| 2013/0343387 | A1* | 12/2013 | Stroud | H04L 45/74 370/392 |
| 2014/0071865 | A1* | 3/2014 | Aggarwal | H04L 5/143 370/295 |
| 2014/0302787 | A1* | 10/2014 | Rantala | H04W 4/008 455/41.2 |
| 2015/0312938 | A1* | 10/2015 | Larmo | H04W 72/0406 370/329 |
| 2016/0094318 | A1* | 3/2016 | Shattil | H04B 7/026 375/267 |
| 2016/0174221 | A1* | 6/2016 | Patil | H04L 5/0055 370/329 |
| 2016/0337110 | A1* | 11/2016 | Yang | H04L 1/1854 |
| 2016/0338106 | A1* | 11/2016 | Liu | H04W 74/0816 |

OTHER PUBLICATIONS

P. Jardosh, K. N. Ramachandran, K. C. Almeroth, and E. M. Belding-Royer, "Understanding congestion in ieee 802.11 b wireless networks," in Proceedings of the 5th ACM SIGCOMM conference on Internet Measurement, pp. 25-25, USENIX Association, 2005.

S. Sen, R. R. Choudhury, and S. Nelakuditi, "Listen (on the frequency domain) before you talk," in Proceedings of the 9th ACM SIGCOMM Workshop on Hot Topics in Networks, p. 16, ACM, 2010.

Cidon, K. Nagaraj, S. Kat, and P. Viswanath, "Flashback: decoupled lightweight wireless control," ACM SIGCOMM Computer Communication Review, vol. 42, No. 4, pp. 223-234, 2012.

S. Lv, X. Dong, Y. Lu, X. Du, X. Wang, Y. Dou, and X. Zhou, "3d pipeline contention: Asymmetric full duplex in wireless networks," in Proceedings of 2014 IEEE INFOCOM, pp. 790-798, IEEE, 2014.

P. Huang, X. Yang, and L. Xiao, "Wifi-BA: Choosing arbitration over backoff in multicarrier wireless networks," in Proceedings of 2013 IEEE INFOCOM, pp. 771-779, 2013.

* cited by examiner

METHOD AND SYSTEM FOR CONTENTION QUEUING USING A QUEUE-BASED MAC PROTOCOL

CROSS-REFERENCE TO RELATED APPLICATIONS

This application claims the benefit of U.S. Provisional Patent Application No. 62/193,065, filed on Jul. 15, 2015, which is incorporated by reference herein in its entirety.

LIST OF ABBREVIATIONS

ACK acknowledgement
AP access point
BEB binary exponential backoff
CIFS contention queuing inter frame spacing
CQ contention queuing
CSMA carrier sense multiple access
CTS clear to send
DCF distributed coordination function
DIFS DCF inter-frame space
ID identity
MAC media access control
OFDM orthogonal frequency division multiplexing
PHY physical layer
RTS request to send
SIFS short inter-frame space
TDMA time division multiple access
WLAN wireless local area network

BACKGROUND

Field of the Invention

The present invention generally relates to a MAC protocol for a multiple-access communication system with multiple nodes contending for a channel. In particular, the present invention relates to the MAC protocol incorporating using a contention queue for coordinating different nodes for data transmission.

LIST OF REFERENCES

There follows a list of references that are occasionally cited in the specification. Each of the disclosures of these references is incorporated by reference herein in its entirety.
[1] J. Fang, K. Tan, Y. Zhang, S. Chen, L. Shi, J. Zhang, Y. Zhang, and Z. Tan, "Fine-grained channel access in wireless lan," *IEEE/ACM Transactions on Networking (TON)*, vol. 21, no. 3, pp. 772-787, 2013.
[2] P. Jardosh, K. N. Ramachandran, K. C. Almeroth, and E. M. Belding-. Royer, "Understanding congestion in ieee 802.11 b wireless networks," in *Proceedings of the 5th ACM SIGCOMM* conference on Internet Measurement, pp. 25-25, USENIX Association, 2005.
[3] IEEE 802.11—wireless lan medium access control (mac) and physical layer (phy) specifications, IEEE Std. 02.11-2007, June 2007.
[4] IEEE 802.11n—enhancements for higher throughput, amendment 4 to ieee 802.11 part 11: Wireless lan medium access control (mac) and physical layer (phy) specifications, IEEE 802.11n/D3.11, December 2007.
[5] S. Sen, R. R. Choudhury, and S. Nelakuditi, "Listen (on the frequency domain) before you talk," in *Proceedings of the 9th ACM SIGCOMM Workshop on Hot Topics in Networks*, p. 16, ACM, 2010.
[6] Cidon, K. Nagaraj, S. Katti, and P. Viswanath, "Flashback: decoupled lightweight wireless control," *ACM SIGCOMM Computer Communication Review*, vol. 42, no. 4, pp. 223-234, 2012.
[7] S. Lv, X. Dong, Y. Lu, X. Du, X. Wang, Y. Dou, and X. Zhou, "3d pipeline contention: Asymmetric full duplex in wireless networks," in *Proceedings of 2014 IEEE INFOCOM*, pp. 790-798, IEEE, 2014.
[8] P. Huang, X. Yang, and L. Xiao, "Wifi-BA: Choosing arbitration over backoff in multicarrier wireless networks," in *Proceedings of 2013 IEEE INFOCOM*, pp. 771-779, 2013.

Description of Related Art

With the rapid development of modern communication technologies such as OFDM, the PHY data rate of IEEE 802.11 WLAN networks has increased a lot. However, the data throughput efficiency (i.e. the ratio between the network throughput and the PHY data rate) may degrade rapidly. For example, if the payload size of a MAC frame is 1500 bytes, the efficiency ratio in an 802.11n network at 300 Mb/s is only 20% [1].

It is always desirable to identify a new technique that can improve the throughput efficiency over existing techniques. Such technique is not only useful for WLANs but also other multiple-access communication systems that employ random access. There is a need in the art for this technique.

SUMMARY OF THE INVENTION

An aspect of the present invention is to provide a method for enabling a plurality of nodes to communicate with an AP over a multiple-access channel. The channel includes a contention subchannel and a transmission subchannel both of which are separate from each other. Each of the nodes has a node ID for identification. Each of the AP and the nodes has an individual CQ buffer for storing a waiting queue of the node IDs of the nodes each already granted with a right of data transmission by the AP.

The method is described as follows. When a first node being one of the nodes has data to be sent to the AP, the first node contends for the right of data transmission until the AP grants this right to the first node. In performing this contention, the first node communicates with the AP over the contention subchannel. When the AP grants the right to the first node, each of the AP and the nodes enqueues the CQ buffer thereof with the node ID of the first node. When the node ID of the first node in the waiting queue of the first node's CQ buffer has a position such that the first node is permitted to send out the data thereof to the AP, the first node transmits the data of the first node to the AP over the transmission channel. When data transmission from the first node to the AP completes, each of the AP and the nodes dequeues from the CQ buffer thereof the node ID of the first node.

In one embodiment, the first node contends for the right of data transmission by sending a RTS to the AP over the contention subchannel, and repeating this sending until the AP transmits a CTS on the contention subchannel to declare that the AP grants the right of data transmission to the first node. Before performing the sending of the RTS, the first node may sense the contention subchannel to determine whether the contention subchannel has been idle for a pre-determined value of DIFS so as to determine whether or not to immediately send out the RTS over the contention subchannel. If the contention subchannel is sensed not to have been idle for the DIFS, the first node re-performs this sensing after a backoff duration determined according to a BEB algorithm. Otherwise, the first node sends the RTS over the contention subchannel.

When data transmission from the first node to the AP completes, the AP may broadcast an ACK to all the nodes so as to inform each of the nodes to perform the dequeuing of the node ID of the first node from the CQ buffer thereof.

When the AP detects that the CQ buffers of all the nodes and the AP are not synchronized, the AP may broadcast the CQ buffer of the AP to the nodes so as to resynchronize the CQ buffers of all the nodes with the CQ buffer of the AP.

When the CQ buffers of all the nodes and the AP are synchronized and are not empty, there are one or more second nodes having the node IDs thereof in the waiting queue of any of the CQ buffers. The one or more second nodes may transmit the data thereof to the AP in a sequential manner of one second node by another second node such that the order of the one or more second nodes in data transmission follows the order of the node IDs in the waiting queue. In one option, the waiting queue is a first-in first-out queue.

Other aspects of the present invention are disclosed as illustrated by the embodiments hereinafter.

DETAILED DESCRIPTION

The present invention provides a novel OFDM-based MAC protocol, called as a CSMA/CQ technique, which is based on the OFDM technology with an objective of improving the throughput efficiency.

Although the invention is hereinafter described in embodiments predominantly based on an example application of the invention to WLANs, the present invention is not limited only to applications for WLANs. The disclosed CSMA/CQ technique is applicable for a communication system in which plural nodes communicate with an AP over a multiple-access channel. The multiple-access channel may be an OFDM channel where each of the nodes uses OFDM to communicate with the AP.

A. The CSMA/CQ Technique

Figure 1:
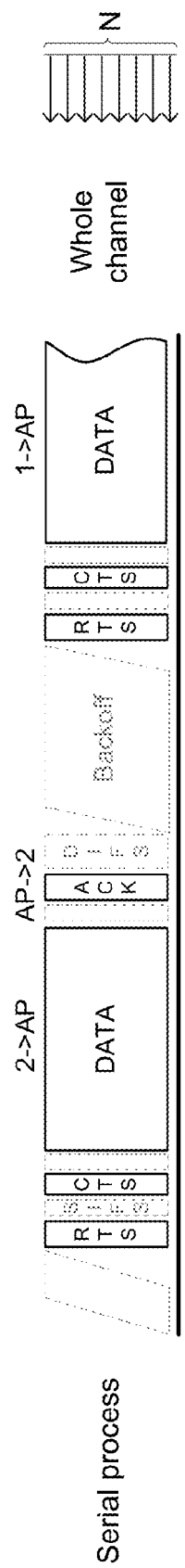
FIG. 1 depicts an example of channel contention and transmission used in an existing IEEE 802.11 system, showing that serial execution of channel contention and transmission occupies the whole channel for an existing DCF technique.

In an existing IEEE 802.11 DCF system employing the RTS/CTS mode, a serial process is used. With the help of FIG. 1, the serial process of DCF is outlined. In the system, after the channel is sensed to have been idle for a duration of DIFS, each node starts to contend for the channel using the 802.11 DCF BEB algorithm, and then sends a RTS frame to an AP for reserving the channel. (The DIFS is a preset time threshold for determining if the channel is likely to be not used by other nodes.) Upon receiving a CTS feedback from the AP, the RTS sender transmits a DATA frame to the AP. Finally, the AP sends an ACK back to the sender node. In FIG. 1, for example, node 2 executes the whole serial process following the pattern: DIFS/backoff/RTS/SIFS/CTS/SIFS/DATA/SIFS/ACK, where the SIFS is the time that the transmitting station will be able to switch back to the receive mode and be capable of decoding the incoming packet.

The reasons for the relatively low efficiency in the existing IEEE 802.11 system are two-fold. First, the contention process and the transmission process (i.e. the data-transmission process) are serial. That is, the whole system is either in the contention state or in the transmission state. The backoff process, generally taking quite a long time, often forces the whole channel to be idle. In the IEEE 802.11 system, each node is required to wait for a random time before transmission. When multiple nodes simultaneously perform backoff, the channel remains idle, naturally leading to under-utilization. It has been shown in [2] that due to backoff, more than 30% of throughput are reduced. Second, an IEEE 802.11 DCF network allocates the entire channel to a station as a single resource. This allocation strategy becomes too coarse-grained when the PHY data rate increases [1]. It is because even if a sender only has a small amount of data for sending, it still needs to occupy the entire channel.

As the IEEE 802.11 standard evolves, a wider bandwidth provides more subcarriers. For example, there are 48 subcarriers available in 802.11g and 104 subcarriers available in 802.11n [3], [4]. Therefore, it is possible to allow different subcarriers to concentrate on different operations (viz., the contention operation and the transmission operation) such that a better design of the MAC protocol is obtainable. This observation is utilized in the present invention.

The disclosed CSMA/CQ technique overcomes the two drawbacks by decomposing the above-mentioned serial process into three concurrent processes. In the CSMA/CQ technique, the whole OFDM channel (i.e. all the subcarriers) is split into two subchannels: one for contention and the other one for data transmission. The CSMA/CQ technique has two salient features: (1) channel contention is in a distributed fashion; and (2) data transmission is in a centralized-control fashion. On the subchannel assigned for contention (hereinafter referred to as the contention subchannel), all nodes follow the 802.11 DCF with the RTS/CTS mode to reserve the subchannel assigned for data transmission (hereinafter referred to as the transmission subchannel). Unlike the existing DCF used by the IEEE 802.11 standard, where the winner in channel contention immediately transmits the data over the whole channel during the next slot, the winner in the CSMA/CQ technique is first added to a contention queue (or a contention buffer) that is broadcast to all nodes so that all the nodes are aware of the position of the winner in the queue. The winner sends the data over the transmission subchannel only during the turn of this winner. On the transmission subchannel, all nodes perform TDMA-like transmission following the order of the node IDs in the contention queue. All the nodes share the same contention queue and therefore the data transmission is performed in a centralized-control fashion. One advantage of the CSMA/CQ technique is that contention and data transmission are executed in parallel so that the whole channel bandwidth is more efficiently utilized.

In the disclosed CSMA/CQ technique, particularly, the original serial process as employed in the existing IEEE 802.11 DCF system is broken down into a contention process, a transmission process and a queuing process with different resources, where the three processes are run concurrently. The contention process employs the contention subchannel as a resource, whereas the transmission process employs the transmission subchannel. For the queuing process, a CQ buffer is used to coordinate the execution of the contention process and the transmission process. With an aid of FIG. 2, the three processes are described as follows.

In the contention process 210, all the nodes use the standard RTS/CTS mechanism in DCF to contend for the channel. When one node finishes a RTS/CTS hand shake, all the nodes store the contention result into their respective CQ buffers. As an example shown in FIG. 2, nodes 2, 1, 3 sequentially win the channel, and all the nodes add these node IDs into their respective buffers one by one.

In the transmission process 230, as long as the CQ buffer of an individual node is not empty, the nodes first listen to the channel, and then sequentially transmit their frames according to the order of node IDs stored in the CQ buffer. For each completion of transmission by one node, all the nodes delete the corresponding node ID from their buffers. As an example illustrated in FIG. 2, nodes 2, 1, 3 sequentially complete their transmissions, and all the nodes remove these node IDs from their buffers one by one.

Figure 2:
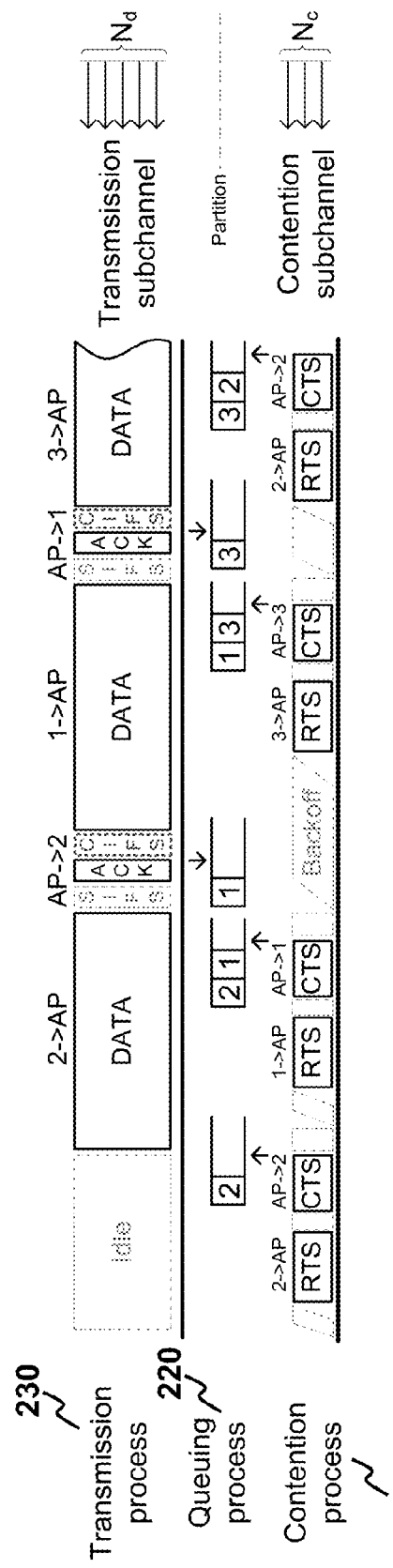
FIG. 2 depicts the channel contention process and the transmission process for CSMA/CQ in accordance with an exemplary embodiment of the present invention, where the two processes are performed on separate subchannels, thereby allowing concurrent execution of the two processes.

By means of the queuing process 220, the contention process 210 and the transmission process 230 are connected. In the queuing process 220, each node dynamically manipulates its own CQ buffer according to the contention process 210 and the transmission process 230. For example, as shown in FIG. 2, nodes 2 and 1 first win the channel in order, and then node 2 completes its transmission. As a result, all the nodes first add the IDs of nodes 2 and 1 into their respective CQ buffers sequentially, and then remove the ID of node 2 from their buffers. In the same manner, the queuing process 220 repeats.

In short, the three processes 210, 220, 230 are concurrently executed, without wasting the whole channel for idle during contention. It greatly improves channel utilization.

A comparison between the disclosed CSMA/CQ technique and existing techniques is made as follows. There exist some MAC protocol designs based on the concept of subcarriers. However, these existing designs either require costly physical-layer technologies, such as [1] and [7], or still keep contention and data transmission to be executed serially, such as [1], [5] and [6]. In [1], it is provided with a fine-grained channel access scheme in which each node contends for a certain number of subcarriers by its traffic demand. In [5], the authors thereof propose a frequency-domain contention scheme in which different nodes chose different subcarriers to contend for the channel and the node choosing the minimum subcarrier number is the winner. In [6], a scheme called flashback in which one subcarrier is picked randomly to feedback ACK is given. In [7], a 3D pipeline contention scheme is provided, where the contention process is divided into several parallel stages and executed in a pipelined manner in a 3D domain specified by time, frequency and spatial antenna; this scheme requires the costly wireless full duplex technique. On the other hand, the CSMA/CQ technique as disclosed herein does not require complicated physical-layer technologies, such as strict time synchronization and wireless full-duplex, while enabling contention and transmission to be executed concurrently.

B. An Exemplary Implementation of a CSMA/CQ System

Figure 3:
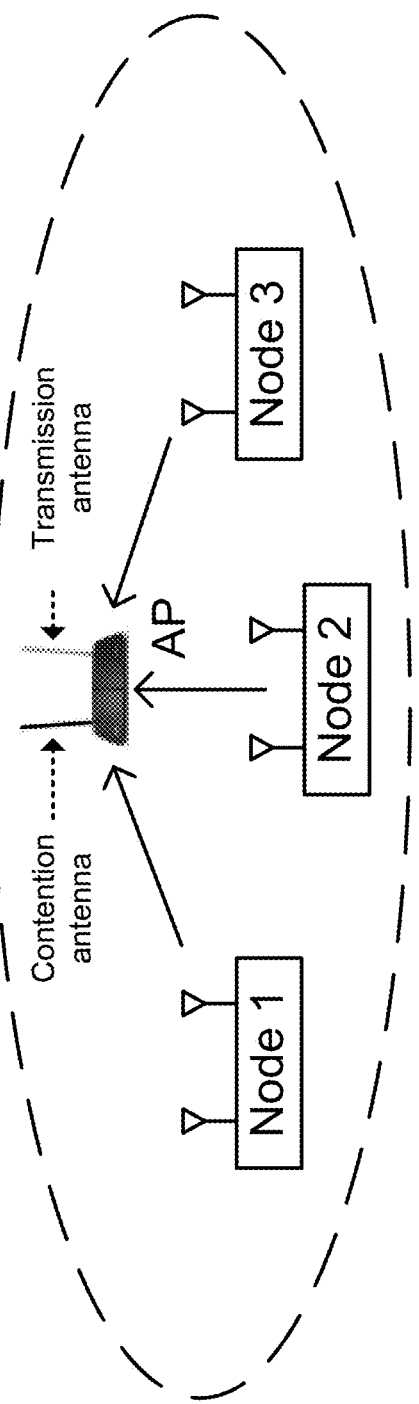
FIG. 3 is a topology of a WLAN used as an example for illustration of the present invention.

In this section, an exemplary CSMA/CQ design in an infrastructure-based WLAN (as shown in FIG. 3) is detailed, where there are one AP and a number of nodes.

B.1 PHY Design

In CSMA/CQ, the physical layer adopts the OFDM technology. It is assumed that the whole channel consisting of N subcarriers is partitioned into two subchannels: the contention subchannel occupying $N_c$ subcarriers and the transmission subchannel occupying $N_d$ subcarriers, as shown in the right part of each of FIG. 2. In CSMA/CQ, each node has two antennas: a contention antenna working on the contention subchannel and a transmission antenna (i.e. data-transmission antenna) working on the transmission subchannel (as shown FIG. 3). It is assumed that the two antennas can work concurrently like [8].

B.2 MAC Design

B.2.1 Three New Structures

Figure 4:
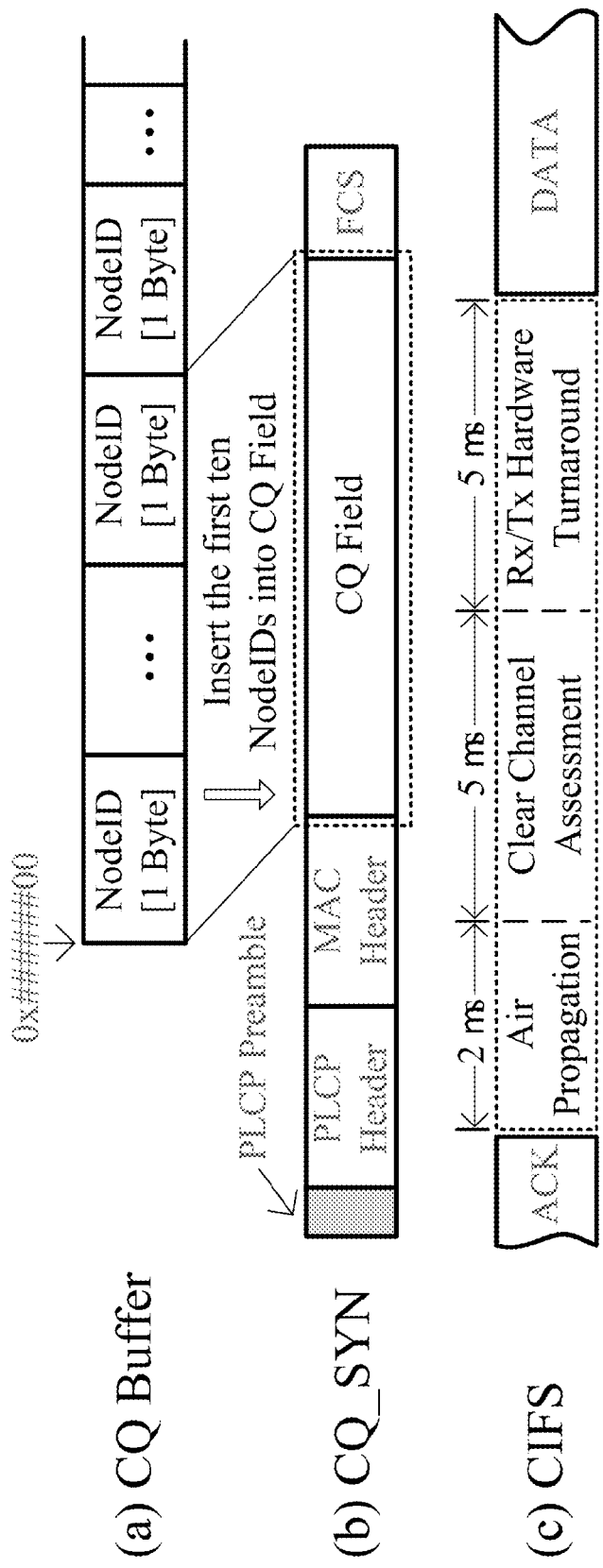
FIG. 4 depicts, in accordance with one embodiment of the present invention, three new structures used in CSMA/CQ: (a) CQ Buffer; (b) CQ_SYN; and (c) CIFS.

CSMA/CQ introduces three novel structures (as illustrated in FIG. 4): the CQ buffer, the CQ_SYN frame, and the CIFS interval.

CQ buffer: The CQ buffer consists of at most 20 bytes. It is used to store the ID of the winner in contention process. When one contention process finishes, the winner's ID will be enqueued into the CQ buffer. When one transmission process finishes, the ID of the node transmitting the frame will be dequeued from the CQ buffer.

CQ_SYN: CQ_SYN is a frame consisting of PLCP Preamble, PLCP header, MAC header, CQ field and FCS field. The CQ_SYN is used to synchronize the transmitting order, where the length of CQ filed is selected to be 10 bytes (though other values may also be used), and where each byte is used to store one node ID. Without loss of generality, here it is assumed that each node ID is mapped from its MAC address. In the transmission process, once detecting that the current sender's ID is not the head of the CQ buffer, the AP constructs a CQ_SYN frame and inserts the first ten node IDs in its own CQ into the CQ field, and then broadcasts it. Upon receiving the CQ_SYN, all nodes will update their CQ buffers.

CIFS: A CIFS time is set to 12 μs, consisting of an Air Propagation, a Clear Channel Assessment and an Rx/Tx Hardware Turnaround time, where Air Propagation is set to 2 μs and the other two are set to 5 μs. The purpose of CIFS is to provide a protection interval when one node's transmission is switched to another one's. It marks the end of the current transmission, and the beginning of a new transmission.

B.2.2 MAC Protocol

For simplicity, the MAC design is described by focusing on the uplink traffic. That is, all nodes send DATA to the AP but the AP just acts as a receiver. In CSMA/CQ, all nodes follows the BEB algorithm to perform the contention process (specified in Algorithm 1 and Algorithm 2 to be detailed below) over the contention subchannel, where the winner of each contention will be added into the CQ buffer. At the same time, all nodes also perform the TDMA-like transmission process (specified in Algorithm 3 and Algorithm 4 to be detailed below) according to the order of node IDs stored in the CQ buffer. The four algorithms are detailed as follows.

---

Algorithm 1: Contention process (Node → AP)

01: Perform backoff (like BEB)
02: // Case 1: Node counts down to zero
03: Send a RTS

| Algorithm 1: Contention process (Node → AP) |
| --- |
| 04:     Delay(SIFS) /*Wait for a CTS*/
05: // If Node itself wins.
06: if Receive a CTS feedback then
07:     /* Node joins buffer and waits for its transmission
08:     (instead of transmitting immediately as in DCF) */
09:     CQ_Enqueue(CTS.DstID)
10: else /* RTS collides */
11:     Increase contention window
12: // Case 2: Node is in backoff
13: if Receive a CTS then // other node wins
14:     CQ_Enqueue(CTS.DstID) // Add it into buffer. |

Algorithm 1 specifies the contention process (Node→AP) where each node transmits RTS over the contention subchannel to reserve the transmission subchannel. In this process, each node performs backoff as BEB. Once the backoff counter reaches zero, the node immediately sends a RTS to the AP and expects a CTS feedback. If there comes a CTS, both the node itself (i.e. the RTS sender in case 1) and other nodes (i.e. the "backing off" nodes in case 2) enqueue CTS.DstID (i.e. the node ID mapped from the Destination field in CTS or the corresponding RTS sender's ID) into their CQ buffers. If there is a collision, the collided nodes double the contention windows, and then perform backoff and repeat the above process.

| Algorithm 2: Contention process (AP → Node) |
| --- |
| 01: if Receive a RTS then
02:     * Add the sender into buffer for scheduling
03:     its transmission */
04:     CQ_Enqueue(RTS.SrcID)
05:     Feed back a CTS (like DCF)
06: end |

Algorithm 2 specifies the contention process (AP Node), where the AP feeds back CTS over the contention subchannel. When the AP receives a RTS frame, it enqueues RTS.SrcID (i.e. the RTS sender's ID) into its CQ buffer, and sends back a CTS like DCF. Note that when compared with DCF, CSMA/CQ does not use the Duration field in RTS and CTS frames, so more functions can be extended to use this Duration field.

| Algorithm 3: Transmission process (Node → AP) |
| --- |
| 01: while (CQ_Head ~= Null)
02:     // Case 1: Node is at the CQ_Head
03:     if (CQ_Head == NodeID) then
04:         if channel remains idle for CIFS then
05:         Send a DATA frame
06:         Delay(SIFS) // Wait for an ACK
07:         if Receive an ACK then
08:             CQ_Dequeue( ) // Delete the ID of transmitted node
09:         else // Update CQ buffer by AP's feedback
10:             if Receive a CQ_SYN then
11:                 CQ_Update(CQ_SYN)
12:                 /* If Node is no longer at the CQ Head, it
13:                 drops the frame being transmitted; otherwise, retransmit */
14:                 if (CQ_Head ~= NodeID) Drop the data frame
15:             else // CQ_SYN timeout
16:                 Goto line 01
17:     end
18:     // Case 2: Node is not at the CQ_Head
19:     if (CQ_Head ~= NodeID) then // Other node is in transmission |

| Algorithm 3: Transmission process (Node → AP) |
| --- |
| 20:         if Receive an ACK then CQ_Dequeue( )
21:     else // Synchronize its CQ buffer with AP
22:         if Receive a CQ_SYN then CQ_Update(CQ_SYN)
23: end |

Algorithm 3 specifies the transmission process (Node→AP), where each node transmits over the transmission subchannel. In this process, each node's transmission order follows the order of NodeIDs stored in the CQ buffer. While the CQ buffer is not empty, each node checks whether the head of the CQ buffer (CQ_Head) equals to NodeID. If yes, the node first sends a DATA frame upon the channel being idle for CIFS and next waits for the AP's response; if no, the node just waits for the AP's response passively. Both the node itself (i.e. the node in case 1, who matches the CQ_Head) and the other nodes (i.e. the nodes in case 2, who do not match the CQ_Head) need to handle the following three situations.

1. If there comes an ACK, nodes dequeue the current CQ_Head as the transmission has been finished.

2. If there comes a CQ_SYN frame (a frame contains the AP's own CQ buffer), it manifests that the AP has found some issues (e.g., out of synchronous or reaching the maximum retry limit) and needs to resynchronize all the CQ buffers. The nodes then update their CQ buffers according to the CQ_SYN (namely, resetting the CQ buffer to a new one obtained from CQ_SYN). In addition, the current transmitter also has to drop the frame being transmitted. (Note that it is a higher layer is responsible for retransmitting the dropped frame.)

3. If CQ_SYN timeout occurs (CQ_SYN timeout is a time longer than ACK timeout, namely, it is the case where nodes receive neither ACK nor CQ_SYN), since CQ_Head remains unchanged, the sender retransmits the DATA frame.

| Algorithm 4: Transmission process (AP → Node) |
| --- |
| 01: while Receive a DATA frame
02:     if No errors in DATA then
03:         if DATA.SrcID == CQ_Head then
04:             Feed back an ACK; CQ_Dequeue( )
05:         else // Synchronize all CQ buffer forcibly
06:             Feed back a CQ_SYN
07:     else //Check RetryLimit for dequeue
08:         if RetryLimit < threshold then RetryLimit++
09:         else CQ_Dequeue( )
10:     // Synchronize all CQ buffers for each retransmission
11:     Feed back a CQ_SYN |

Algorithm 4 specifies the transmission process (AP Node), where the AP responds towards present transmission over the transmission subchannel. Upon receiving a DATA frame, the AP first uses the FCS field to check whether the frame is corrupted. If there are no errors, the AP then turns to compare its CQ_HEAD with DATA.SrcID (i.e. the DATA sender's ID). If they match, the AP feeds back an ACK and dequeues its CQ_HEAD to finish the transmission; otherwise it broadcasts a CQ_SYN frame to synchronize all the CQ buffers forcibly. If there is any error in DATA, the AP first checks RetryLimit (namely, the number of times that the corresponding node has retransmitted for). If RetryLimit reaches the threshold (the threshold being chosen by experience, in general), the AP infers that the corresponding channel may not be satisfactory, thus dequeuing CQ_HEAD (namely, dropping the corresponding node to release channel for other better-condition nodes) and broadcasting a CQ_SYN. If the RetryLimit is lower than threshold, the AP only broadcasts a CQ_SYN to let the node retransmit.

C. Performance Evaluation

The performance of CSMA/CQ is evaluated by simulation. The CSMA/CQ simulator was written using C++. The parameters used are shown in Table I. Each simulation value was obtained by averaging over five simulation runs, where each run lasted for 100 seconds.

TABLE I

Parameters used in simulation.

| N | 48 | RATE | 54 Mbps |
|---|---|---|---|
| $N_c$ | 6 | P Header | 26 bytes |
| $N_d$ | 42 | M Header | 28 bytes |
| σ | 28 μs | RTS | 20 bytes |
| SIFS | 10 μs | CTS | 14 bytes |
| CIFS | 12 μs | ACK | 14 bytes |
| DIFS | 50 μs | DATA | 1000 bytes |

Figure 5:
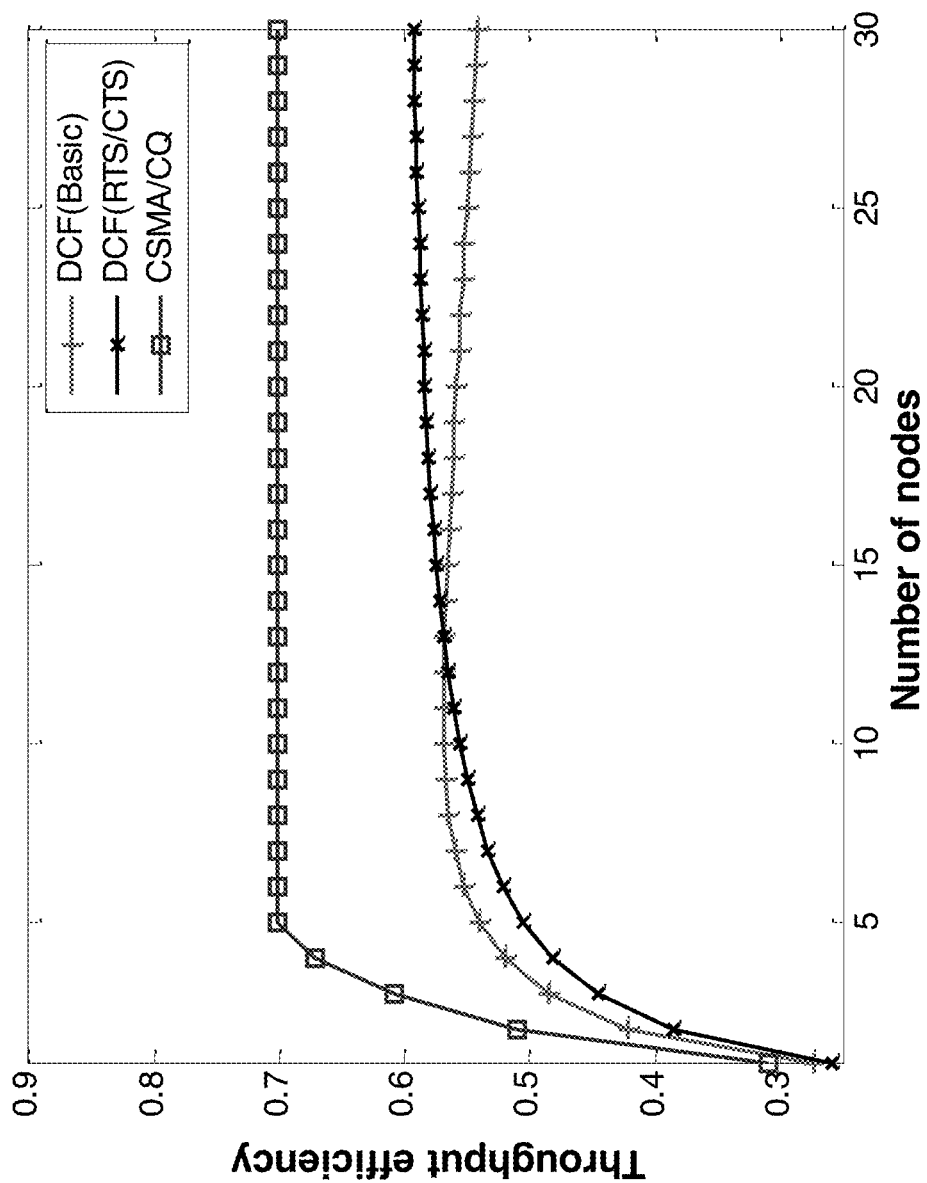
FIG. 5 provides a comparison of throughput efficiency among CSMA/CQ, DCF basic access mode, and DCF RTS/CTS mode as obtained from simulation.

FIG. 5 compares the throughput efficiency among CSMA/CQ, DCF RTS/CTS mode, DCF basic access mode when the number of nodes, n, varies from 1 to 30, where $N_c$:$N_d$=6:42. From FIG. 5, the following observations are made. As n increases, the throughput efficiency in CSMA/CQ first quickly rises to the maximum value and then keeps almost unchanged, and always outperforms the other two protocols. A rough calculation reveals that the improvement in the throughput efficiency is about 20%. For example, as n varies from 5 to 30, the efficiency in CQMA/CQ is always equal to about 0.7, while the efficiencies that the other two protocols reaches are at most 0.59. The reason for the high efficiency in CSMA/CQ is that the collision in CSMA/CQ only happens in contention subchannel and only corrupts RTS frame, so that it will not affect the DATA transmission, whereas the collision in the other two protocols wastes the whole channel. Note that the efficiency for DCF basic access mode first increases and then decreases as n increases. The reason is that more contending nodes will cause more collisions, and these collisions will frequently corrupt the DATA frames (rather than the short RTS frame) in the basic access mode, wasting more time.

Figure 6:
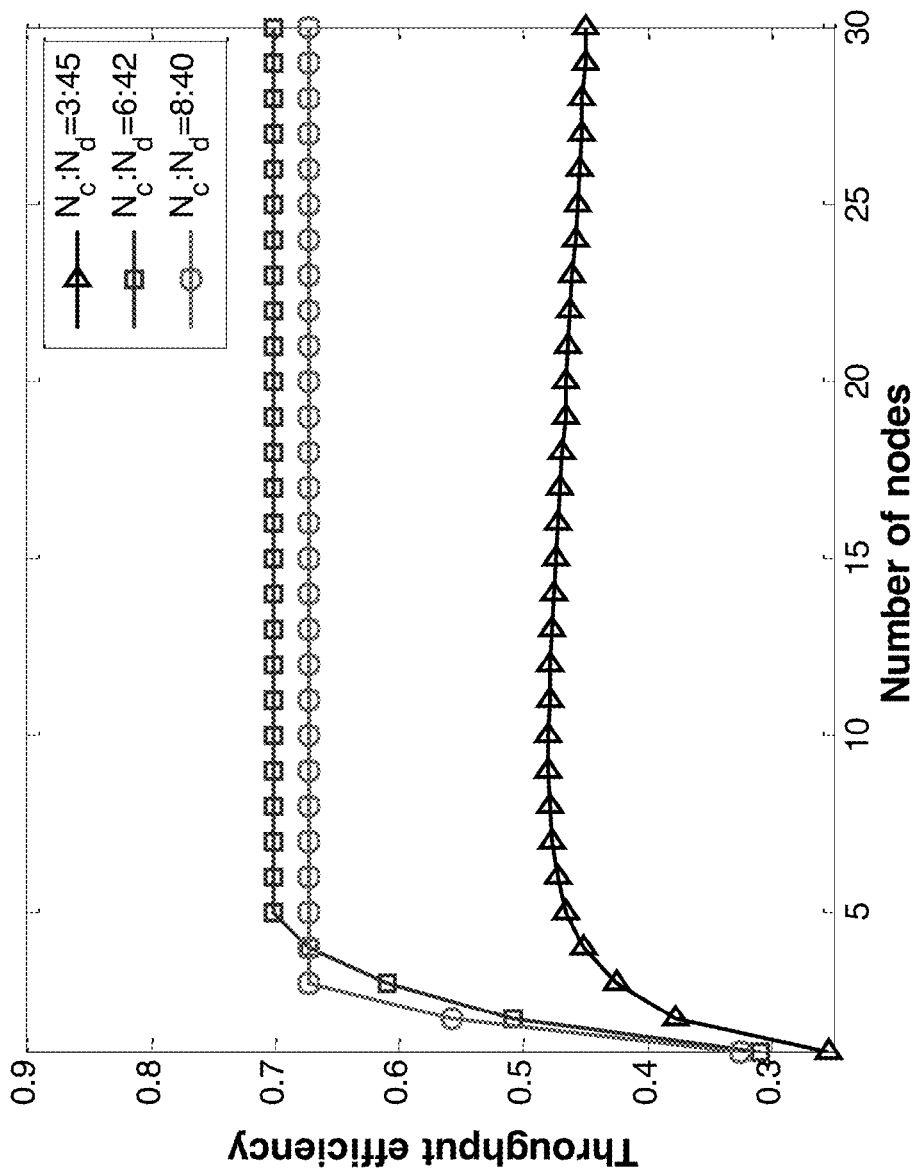
FIG. 6 depicts throughput efficiency obtained from simulation as the ratio of $N_c$ to $N_d$ varies.

FIG. 6 plots the network throughput when the number of nodes varies from 1 to 30, where $N_c$:$N_d$=3:45, 6:42, 8:40 respectively. From FIG. 6, it is apparent that the network can achieve a throughput as high as 0.7 when $N_c$:$N_d$=6:42, but it decreases when $N_c$ becomes larger or smaller (i.e. when $N_c$:$N_d$=3:45, 8:40). It follows that there exists an optimal solution in selecting $N_c$:$N_d$. It can be explained as follow. A larger $N_c$ indicates a larger bandwidth for the contention process and a smaller bandwidth for the transmission process (since the sum of $N_c$ and $N_d$ is constant). As a result, for a large $N_c$, the contention process occupies too much resource and consequently stretches the transmission time. For a small $N_c$, on the other hand, the contention process is allocated with very little resource so that contention cannot be done before current transmission completes, leading to a low channel utilization in the transmission subchannel.

D. The Present Invention

The present invention is developed based on the CSMA/CQ technique and an implementation thereof as disclosed in Sections B and C above.

An aspect of the present invention is to provide a method for enabling a plurality of nodes to communicate with an AP over a multiple-access channel. The channel includes a contention subchannel and a transmission subchannel. In addition, the contention subchannel and the transmission subchannel are separate from each other. Each of the nodes has a node ID for identification. Each of the AP and the nodes has an individual CQ buffer for storing a waiting queue of the node IDs of the nodes each already granted with a right of data transmission by the AP.

Exemplarily, the method is illustrated as follows. For a first node that is one of the nodes, when the first node has data to be sent to the AP, the first node contends for the right of data transmission until the AP grants the right of data transmission to the first node. In particular, the first node contends for the right by communicating with the AP on the contention subchannel. When the AP grants the right to the first node, each of the AP and the nodes enqueues the CQ buffer thereof with the node ID of the first node. When the node ID of the first node in the waiting queue of the first node's CQ buffer has a position such that the first node is permitted to send out the data thereof to the AP, the first node transmits the data thereof to the AP over the transmission channel. When data transmission from the first node to the AP completes, each of the AP and the nodes dequeues from the CQ buffer thereof the node ID of the first node.

The method may further include one or more of the following options.

When data transmission from the first node to the AP completes, the AP may broadcast an ACK to all the nodes so as to inform each of the nodes to perform the dequeuing of the node ID of the first node from the CQ buffer thereof.

When the AP detects that the CQ buffers of all the nodes and the AP are not synchronized, the AP may broadcast the CQ buffer of the AP to the nodes so as to resynchronize the CQ buffers of all the nodes with the CQ buffer of the AP.

When the CQ buffers of all the nodes and the AP are synchronized and are not empty, there are one or more second nodes having the node IDs thereof in the waiting queue of any of the CQ buffers. The one or more second nodes may transmit the data thereof to the AP in a sequential manner of one second node by another second node such that the order of the one or more second nodes in data transmission follows the order of the node IDs in the waiting queue.

The waiting queue may be a first-in first-out queue.

In one practical implementation of performing the contending for the right of data transmission by the first node, the first node sends a RTS to the AP over the contention subchannel, and repeats the sending of the RTS to the AP until the AP transmits a clear to send (CTS) on the contention subchannel to declare that the AP grants the right of data transmission to the first node. Before performing the sending of the RTS, preferably the first node senses the contention subchannel to determine whether the contention subchannel has been idle for a pre-determined value of DIFS so as to determine whether or not to immediately send out the RTS over the contention subchannel. For example, the value of DIFS may be determined from the IEEE 802.11 standard if the disclosed method is applied to a WLAN compliant to this standard. If the contention subchannel is sensed not to have been idle for the DIFS, the contention subchannel is sensed again after a backoff duration determined according to a BEB algorithm. Otherwise, the sending of the RTS is performed.

For a communication system that implements the disclosed method, the system may be designed to employ OFDM in data communications between the AP and each of the nodes. It follows that the multiple-access channel is an OFDM channel having a plurality of subcarrier channels. The contention subchannel and the transmission subchannel may consist of a first number and a second number of the subcarrier channels, respectively, where the subcarrier channels of the contention subchannel do not overlap with those of the transmission subchannel. Preferably, the second number is greater than the first number, so that more bandwidth is allocated for data transmission than for contention.

Advantageously, the disclosed method is usable in a WLAN comprising the AP and the plurality of nodes. Preferably, each of the AP and the nodes has at least two antennas such that one antenna is used for communication over the contention channel and another antenna is for communication over the transmission channel.

In the embodiments disclosed herein, an AP or a node may be implemented using general purpose or specialized computing devices, computer processors, or electronic circuitries including but not limited to digital signal processors, application specific integrated circuits, field programmable gate arrays, and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for enabling a plurality of nodes to communicate with an access point (AP) over a multiple-access channel, the channel including a contention subchannel and a transmission subchannel both of which are separate from each other, each of the nodes having a node identity (ID) for identification, each of the AP and the nodes having an individual contention queue (CQ) buffer for storing a waiting queue of the node IDs of the nodes each already granted with a right of data transmission by the AP, the method comprising:

when a first node being one of the nodes has data to be sent to the AP, contending, by the first node, for the right of data transmission until the AP grants the right of data transmission to the first node, wherein the first node contends for the right by communicating with the AP on the contention subchannel;

when the AP grants the right to the first node, enqueuing, by each of the AP and the nodes, the CQ buffer thereof with the node ID of the first node; and when the CQ buffers of all the nodes and the AP are not empty and are synchronized so that the waiting queues stored in the nodes and the AP are the same, transmitting, by one or more second nodes having the node IDs thereof in the waiting queue of any of the CQ buffers, the data of the one or more second nodes to the AP in a sequential manner of one second node by another second node such that the order of the one or more second nodes in data transmission follows the order of the node IDs in the waiting queue, wherein the transmitting of the data of the one or more second nodes to the AP comprises:

when the node ID of the first node in the waiting queue of the first node's CQ buffer has a position such that the first node is permitted to send out the data thereof to the AP, transmitting, by the first node, the data of the first node to the AP over the transmission subchannel; and when data transmission from the first node to the AP completes, dequeuing, by each of the AP and the nodes, from the CQ buffer thereof the node ID of the first node.

2. The method of claim 1, wherein the contending for the right of data transmission by the first node comprises:

sending a request to send (RTS) to the AP over the contention subchannel; and repeating the sending of the RTS to the AP until the AP transmits a clear to send (CTS) on the contention subchannel to declare that the AP grants the right of data transmission to the first node.

3. The method of claim 2, wherein the contending for the right of data transmission by the first node further comprises:

before performing the sending of the RTS, sensing the contention subchannel to determine whether the contention subchannel has been idle for a pre-determined value of distributed-coordination-function inter-frame space (DIFS) so as to determine whether or not to immediately send out the RTS over the contention subchannel;

responsive to determining that the contention subchannel has not been idle for the DIFS, re-performing the sensing of the contention subchannel after a backoff duration determined according to a binary exponential backoff (BEB) algorithm; and performing the sending of the RTS in response to determining that the contention subchannel has been idle for the DIFS.

4. The method of claim 1, further comprising:

when data transmission from the first node to the AP completes, broadcasting, by the AP, an ACK to all the nodes so as to inform each of the nodes to perform the dequeuing of the node ID of the first node from the CQ buffer thereof.

5. The method of claim 1, further comprising:

when the AP detects that the CQ buffers of all the nodes and the AP are not synchronized, broadcasting, by the AP, the CQ buffer of the AP to the nodes so as to resynchronize the CQ buffers of all the nodes with the CQ buffer of the AP.

6. The method of claim 1, wherein the waiting queue of each of the CQ buffers is a first-in first-out queue.

7. The method of claim 1, wherein:

the channel is an orthogonal frequency division multiplexing (OFDM) channel having a plurality of subcarrier channels;

the contention subchannel consists of a first number of the subcarrier channels;

the transmission subchannel consists of a second number of the subcarrier channels; and the subcarrier channels of the contention subchannel do not overlap with the subcarrier channels of the transmission subchannel.

8. The method of claim 7, wherein the second number is greater than the first number.

9. A wireless local area network (WLAN) system comprising:
   an access point (AP); and
   a plurality of nodes each communicable with the AP over a multiple-access channel, each of the nodes having a node identity (ID) for identification;
   wherein:
      the channel includes a contention subchannel and a transmission subchannel both of which are separate from each other;
      each of the AP and the nodes comprises an individual contention queue (CQ) buffer for storing a waiting queue of the node IDs of the nodes each already granted with a right of data transmission by the AP;
      each of the nodes is configured such that when a first node being one of the nodes has data to be sent to the AP, the first node contends for the right of data transmission until the AP grants the right of data transmission to the first node, wherein the first node contends for the right by communicating with the AP on the contention subchannel;
      each of the AP and the nodes is further configured such that when the AP grants the right to the first node, each of the AP and the nodes enqueues the CQ buffer thereof with the node ID of the first node; and
      each of the AP and the nodes is further configured such that when the CQ buffers of all the nodes and the AP are not empty and are synchronized so that the waiting queues stored in the nodes and the AP are the same, one or more second nodes having the node IDs thereof in the waiting queue of any of the CQ buffers transmit the data of the one or more second nodes to the AP in a sequential manner of one second node by another second node such that the order of the one or more second nodes in data transmission follows the order of the node IDs in the waiting queue, wherein in transmitting the data of the one or more second nodes to the AP:
         when the node ID of the first node in the waiting queue of the first node's CQ buffer has a position such that the first node is permitted to send out the data thereof to the AP, the first node transmits the data thereof to the AP over the transmission subchannel, and
         when data transmission from the first node to the AP completes, each of the AP and the nodes dequeues from the CQ buffer thereof the node ID of the first node.

10. The WLAN system of claim 9, wherein each of the AP and the nodes has at least two antennas such that one antenna is used for communication over the contention subchannel and another one is for communication over the transmission subchannel.

11. The WLAN system of claim 9, wherein the first node contends for the right of data transmission by executing a process comprising:
   sending a request to send (RTS) to the AP over the contention subchannel; and
   repeating the sending of the RTS to the AP until the AP transmits a clear to send (CTS) on the contention subchannel to declare that the AP grants the right of data transmission to the first node.

12. The WLAN system of claim 11, wherein the process further comprises:
   before performing the sending of the RTS, sensing the contention subchannel to determine whether the contention subchannel has been idle for a pre-determined value of distributed-coordination-function inter-frame space (DIFS) so as to determine whether or not to immediately send out the RTS over the contention subchannel;
   responsive to determining that the contention subchannel has not been idle for the DIFS, re-performing the sensing of the contention subchannel after a backoff duration determined according to a binary exponential backoff (BEB) algorithm; and
   performing the sending of the RTS in response to determining that the contention subchannel has been idle for the DIFS.

13. The WLAN system of claim 9, wherein the AP is further configured to, when data transmission from the first node to the AP completes, broadcast an ACK to all the nodes so as to inform each of the nodes to perform the dequeuing of the node ID of the first node from the CQ buffer thereof.

14. The WLAN system of claim 9, wherein the AP is further configured to, when the AP detects that the CQ buffers of all the nodes and the AP are not synchronized, broadcast the CQ buffer of the AP to the nodes so as to resynchronize the CQ buffers of all the nodes with the CQ buffer of the AP.

15. The WLAN system of claim 9, wherein the waiting queue of each of the CQ buffers is a first-in first-out queue.

16. The WLAN system of claim 9, wherein:
   the channel is an orthogonal frequency division multiplexing (OFDM) channel having a plurality of subcarrier channels;
   the contention subchannel consists of a first number of the subcarrier channels;
   the transmission subchannel consists of a second number of the subcarrier channels; and
   the subcarrier channels of the contention subchannel do not overlap with the subcarrier channels of the transmission subchannel.

17. The WLAN system of claim 16, wherein the second number is greater than the first number.

* * * * *